United States Patent
Kitahara et al.

(10) Patent No.: US 9,529,905 B2
(45) Date of Patent: Dec. 27, 2016

(54) INFORMATION PROCESSING DEVICE, INFORMATION PROCESSING METHOD, PROGRAM, AND INFORMATION STORAGE MEDIUM

(71) Applicant: Sony Computer Entertainment Inc., Tokyo (JP)

(72) Inventors: Naoki Kitahara, Kanagawa (JP); Akihito Nagata, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 171 days.

(21) Appl. No.: 14/355,331

(22) PCT Filed: Oct. 5, 2012

(86) PCT No.: PCT/JP2012/075931
§ 371 (c)(1),
(2) Date: Apr. 30, 2014

(87) PCT Pub. No.: WO2013/069396
PCT Pub. Date: May 16, 2013

(65) Prior Publication Data
US 2014/0257541 A1    Sep. 11, 2014

(30) Foreign Application Priority Data
Nov. 9, 2011    (JP) .................................. 2011-245072

(51) Int. Cl.
*G06F 17/00*    (2006.01)
*G06F 17/30*    (2006.01)
(Continued)

(52) U.S. Cl.
CPC ............. *G06F 17/3074* (2013.01); *G06F 3/16* (2013.01); *G06F 3/165* (2013.01); *H04M 1/72544* (2013.01); *H04M 1/72558* (2013.01)

(58) Field of Classification Search
CPC ..................... H04M 1/72558; H04M 1/72544; G06F 3/165; G06F 3/16; G06F 17/3074
See application file for complete search history.

(56) References Cited

U.S. PATENT DOCUMENTS 5,703,794 A * 12/1997 Heddle .................. H04H 60/04
370/267
2004/0023646 A1    2/2004 Inami
(Continued)

FOREIGN PATENT DOCUMENTS

EP    1387593 A2    2/2004
JP    2000122718 A    4/2000
(Continued)

OTHER PUBLICATIONS

Office Action for corresponding JP Application 2013542896, dated Mar. 24, 2015.
(Continued)

*Primary Examiner* — Fan Tsang
*Assistant Examiner* — David Siegel
(74) *Attorney, Agent, or Firm* — Matthew B. Dernier, Esq.

(57) ABSTRACT

To be able to change settings for selective changing control of a program as a target for sound input/output flexibly. A background music (BGM) sound selection managing section obtains priority values set to a plurality of programs, respectively. The BGM sound selection managing section performs control such that a program selected from among the plurality of programs on a basis of the obtained priority values becomes a target for selective sound input/output from/to an outside.

9 Claims, 5 Drawing Sheets

(51) Int. Cl.
*G06F 3/16* (2006.01)
*H04M 1/725* (2006.01)

(56) References Cited

U.S. PATENT DOCUMENTS

| | | | |
|---|---|---|---|
| 2008/0186960 A1* | 8/2008 | Kocheisen | ............ G06F 3/165 370/359 |
| 2008/0248816 A1* | 10/2008 | Hatano | ............ H04M 1/6016 455/458 |
| 2009/0036108 A1 | 2/2009 | Cho | |
| 2012/0259440 A1 | 10/2012 | Zhang | |

FOREIGN PATENT DOCUMENTS

| | | | |
|---|---|---|---|
| JP | 2004078936 A | 3/2004 | |
| JP | 2008236687 A | 10/2008 | |
| JP | 2009111637 A | 5/2009 | |
| WO | 2011079758 A1 | 7/2011 | |

OTHER PUBLICATIONS

International Search Report for corresponding PCT/JP2012/075931, dated Dec. 25, 2012.
PCT/IPEA/408 for PCT/JP2012/075931,dated Dec. 24, 2013 (no translation available).
International Preliminary Report on Patentability for corresponding PCT/JP2012/075931, dated Jul. 10, 2014.
European Search Report for corresponding EP Application No. 12847649.6-1957, dated Jun. 17, 2015.

* cited by examiner

FIG.4

| BGM PRIORITY MANAGEMENT ID | APPLICATION NAME DATA | BGM OUTPUT RIGHT OBTAINING REQUEST SETTING DATA | BGM PRIORITY | |
|---|---|---|---|---|
| 001 | — | DEFAULT SETTING | 0 | } 70 |
| 002 | MUSIC PLAYER PROGRAM | PRIORITY SETTING | 10 | } 70 |
| 003 | CHAT PROGRAM (SUB-PRIORITY) | PRIORITY SETTING | 20 | } 70 |
| 004 | GAME PROGRAM | PRIORITY SETTING | 30 | } 70 |
| 005 | TIME SIGNAL PROGRAM | PRIORITY SETTING | 40 | } 70 |
| | | | | |

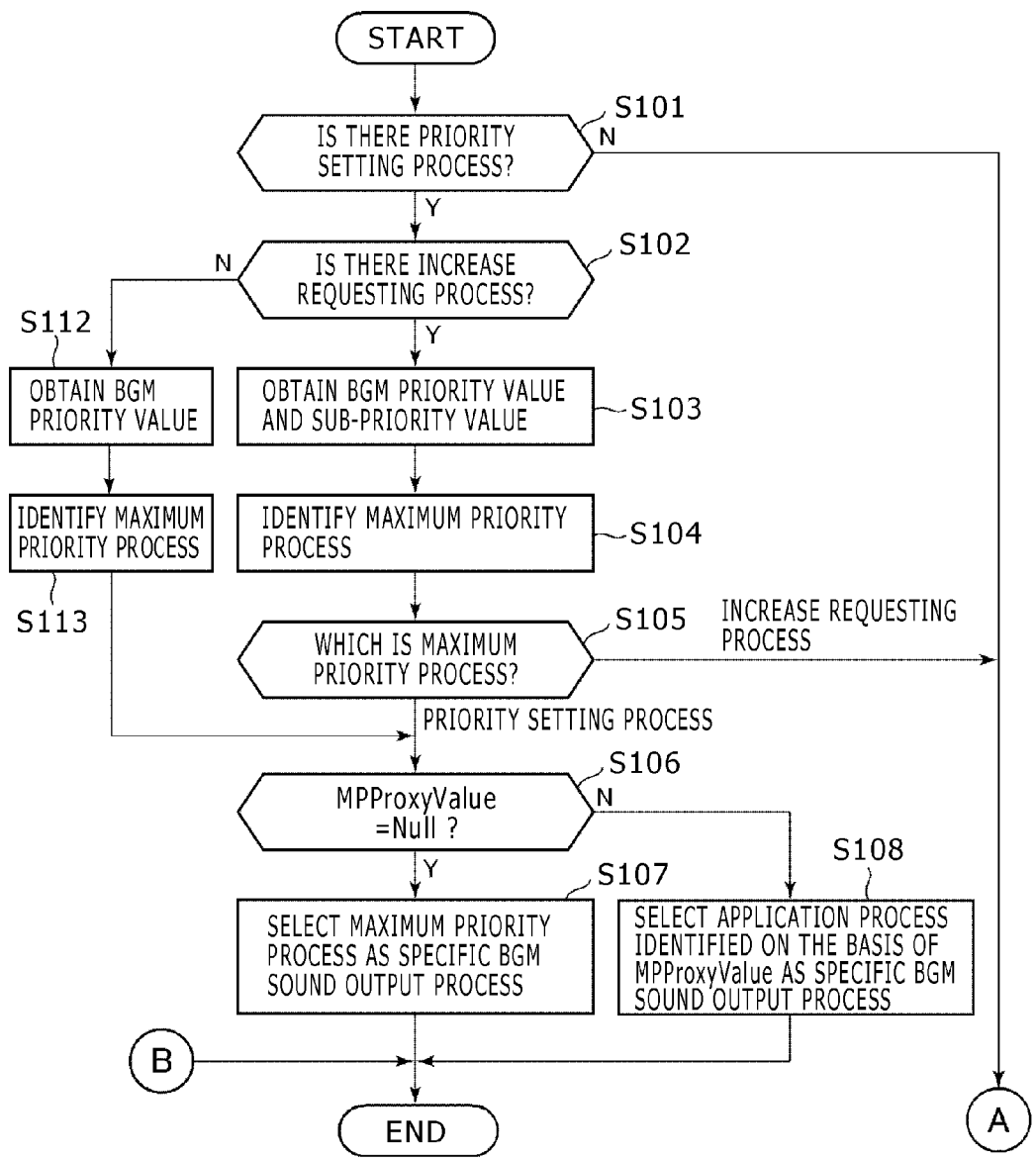

INFORMATION PROCESSING DEVICE, INFORMATION PROCESSING METHOD, PROGRAM, AND INFORMATION STORAGE MEDIUM

TECHNICAL FIELD

The present invention relates to an information processing device, an information processing method, a program, and an information storage medium.

BACKGROUND ART

There are information processing devices capable of executing a plurality of programs simultaneously. Then, some of such information processing devices change a sound output as BGM according to conditions of program execution.

Specifically, for example, there is an information processing device that performs control so as to change a sound output as BGM from a sound accompanying the execution of a game program (for example a reproduced sound of an audio file stored in association with the game program or a sound generated by executing the game program) to a reproduced sound of an audio file shown in a setting in a music player when the reproduction of the audio file by the music player is started, and return the sound output as BGM from the reproduced sound of the audio file shown in the setting in the music player to the sound accompanying the execution of the game program when the reproduction of the audio file by the music player is ended.

SUMMARY

Technical Problems

However, settings related to changing control of an output sound in the conventional technology are fixed such that, for example, the output sound is changed to a sound reproduced by a music player when the music player starts the reproduction. Hence, with the conventional technology, flexible setting changes cannot be made in conditions where the settings related to changing control of the output sound need to be changed, such for example as a situation in which a program to be executed is added or deleted. Incidentally, this applies not only to situations where selective changing control of a program serving as an output source of a sound is performed but also situations where selective changing control of a program serving as an output destination of a sound input from the outside via a device such as a microphone or a headset, for example, is performed.

The present invention has been made in view of the above-described problems. An object of the present invention is to be able to change settings for selective changing control of a program as a target for sound input/output flexibly.

Solution to Problems

In order to solve the above-described problems, an information processing device according to the present invention includes: obtaining means for obtaining priority values set to a plurality of programs, respectively; and input/output target control means for performing control such that a program selected from among the plurality of programs on a basis of the priority values obtained by the obtaining means becomes a target for selective sound input/output from/to an outside.

In addition, an information processing method according to the present invention includes: an obtaining step of obtaining priority values set to a plurality of programs, respectively; and an input/output target control step of performing control such that a program selected from among the plurality of programs on a basis of the priority values obtained by the obtaining means becomes a target for selective sound input/output from/to an outside.

In addition, a program according to the present invention makes a computer function as: obtaining means for obtaining priority values set to a plurality of programs, respectively; and input/output target control means for performing control such that a program selected from among the plurality of programs on a basis of the priority values obtained by the obtaining means becomes a target for selective sound input/output from/to an outside.

In addition, an information storage medium according to the present invention is a computer readable information storage medium storing a program, the program making a computer function as: obtaining means for obtaining priority values set to a plurality of programs, respectively; and input/output target control means for performing control such that a program selected from among the plurality of programs on a basis of the priority values obtained by the obtaining means becomes a target for selective sound input/output from/to an outside.

According to the present invention, by merely setting the priority values appropriately, control is performed such that a program selected from among the plurality of programs on the basis of the priority values becomes a target for selective sound input/output from/to the outside. Thus, settings for selective changing control of a program as a target for sound input/output can be changed flexibly.

In one mode of the present invention, when sound input/output for the program as the target for selective sound input/output from/to the outside is ended, the input/output target control means changes the program as the target for selective sound input/output from/to the outside to a program determined as having highest priority from among other programs of the plurality of programs on a basis of the priority values set to the other programs, respectively.

In addition, in one mode of the present invention, when a specification of a program to be made to input/output a sound is set in the program selected on the basis of the priority values, the input/output target control means performs control such that the specified program becomes the target for selective sound input/output from/to the outside, and the input/output target control means otherwise performs control such that the program selected on the basis of the priority values becomes the target for selective sound input/output from/to the outside.

In addition, in one mode of the present invention, when a program requesting that a program that has generated displayed information be set as the target for selective sound input/output from/to the outside is selected on the basis of the priority values, the input/output target control means performs control such that the program that has generated the displayed information becomes the target for selective sound input/output from/to the outside.

In addition, in one mode of the present invention, when the input/output target control means changes an output sound, the input/output target control means performs crossfade processing that gradually increases volume of a sound after the change while gradually decreasing volume of the sound before the change.

BRIEF DESCRIPTION OF DRAWINGS

FIG. 4 is a diagram showing an example of BGM priority management data.

FIG. 5A is a flowchart of an example of a flow of processing performed in the information processing device according to one embodiment of the present invention.

DESCRIPTION OF EMBODIMENTS

An embodiment of the present invention will hereinafter be described in detail with reference to the drawings.

Figure 1:
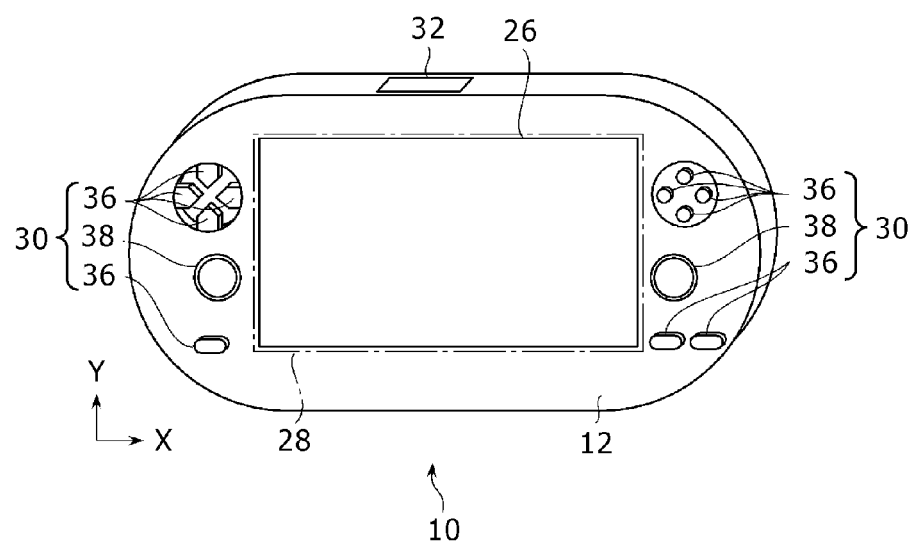
FIG. 1 is a perspective view of an example of an external appearance of an information processing device according to one embodiment of the present invention.
Figure 2:
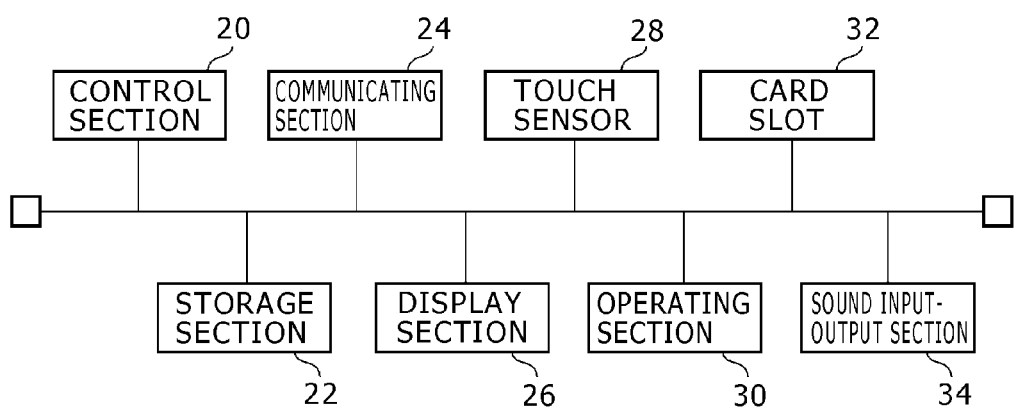
FIG. 2 is a block diagram showing an example of hardware configuration of the information processing device according to one embodiment of the present invention.

FIG. 1 is a perspective view of an example of an external appearance of an information processing device 10 according to an embodiment of the present invention. FIG. 2 is a block diagram showing an example of hardware configuration of the information processing device 10 shown in FIG. 1. Suppose that the information processing device 10 according to the present embodiment is a portable type device such for example as a portable type game machine.

As shown in FIG. 1, a casing 12 of the information processing device 10 according to the present embodiment has a flat shape as a whole. In addition, the casing 12 of the information processing device 10 according to the present embodiment has a connector into which a cable can be inserted, so that the casing 12 and an external device can be connected to each other. As shown in FIG. 1 and FIG. 2, the information processing device 10 according to the present embodiment includes a control section 20, a storage section 22, a communicating section 24, a display section 26, a touch sensor 28, an operating section 30, a card slot 32, a sound input-output section 34, and the like. These elements are connected to each other via a bus.

The control section 20 is for example a CPU or the like. The control section 20 performs various kinds of information processing according to a program stored in the storage section 22. The storage section 22 is a memory element such for example as a RAM or a ROM. The storage section 22 stores the program executed by the control section 20 and various kinds of data. The storage section 22 also functions as a work memory for the control section 20. The communicating section 24 is for example a network interface (specifically a wireless LAN module, for example). The communicating section 24 transmits information to another information processing device 10, a server (not shown) on the Internet, and the like according to an instruction input from the control section 20. In addition, the communicating section 24 outputs received information to the control section 20.

The display section 26 is various kinds of devices for displaying an image, such for example as a liquid crystal display panel and an organic EL display panel. As shown in FIG. 1, in the present embodiment, the display section 26 is disposed in the front surface of the casing 12, and the screen of the display section 26 has a substantially rectangular shape. Hereinafter, the horizontal direction (direction of width) of the screen will be set as an X-axis direction, and a direction from a left to a right as viewed from the front surface of the screen will be set as an X-axis positive direction. In addition, the vertical direction (direction of height) of the screen will be set as a Y-axis direction, and a direction from a bottom to a top as viewed from the front surface of the casing 12 will be set as a Y-axis positive direction.

The touch sensor 28 has a substantially rectangular detecting surface having a shape and a size that correspond to the screen. When an object comes into contact with the detecting surface, the touch sensor 28 detects the contact position of the object. In addition, in the present embodiment, the touch sensor 28 sequentially detects the contact position of the object at predetermined time intervals. As shown in FIG. 1, in the present embodiment, the detecting surface of the touch sensor 28 is disposed on the front surface of the casing 12 so as to be superposed on the screen of the display section 26. Incidentally, suppose in the following description that a user performs operating input by bringing a finger of the user into contact with the touch sensor 28. However, without being limited to this, the user may perform operating input by bringing an object held in a hand of the user, such as a stylus or the like, into contact with the detecting surface. In addition, the touch sensor 28 does not necessarily detect the position of the object only when the object comes into contact with the detecting surface, but may detect the position of the object with respect to the detecting surface when the object is brought into proximity to a detectable range on the detecting surface. The touch sensor 28 may be of any type such for example as a capacitance type, a pressure sensitive type, or an optical type, as long as the touch sensor 28 is a device capable of detecting the position of the object on the detecting surface. Incidentally, the information processing device 10 may include a touch sensor 28 disposed on the back surface of the casing 12 so as to be opposed to the touch sensor 28 disposed on the front surface of the casing 12.

The operating section 30 is for example a kind of operating member used by the user to perform operating input to the information processing device 10 together with the touch sensor 28. FIG. 1 shows buttons 36 and analog sticks 38 disposed on the front surface of the casing 12 of the information processing device 10 as an example of operating members forming the operating section 30. Incidentally, the information processing device 10 may include for example a switch and a button 36 disposed on the upper side surface of the casing 12 as operating members forming the operating section 30.

The card slot 32 is a slot into and from which an information storage medium such as various kinds of memory cards and the like can be inserted and removed. According to an instruction from the control section 20, the card slot 32 reads a program, data, and the like recorded on the information storage medium such as a memory card or the like inserted in the card slot 32, and writes data to the information storage medium such as a memory card or the like inserted in the card slot 32. In the present embodiment, the card slot 32 is disposed in the upper side surface of the casing of the information processing device 10. Incidentally, the information processing device 10 may include a plurality of card slots 32, and the plurality of card slots 32 may allow information storage media of standards different from each other to be inserted into and removed from the plurality of card slots 32.

The sound input-output section 34 collects an externally input sound (for example a voice uttered by the user) and outputs the sound as an electric signal to the control section 20, or converts an electric signal input from the control section 20 into a sound and outputs the sound to the outside.

Figure 3:
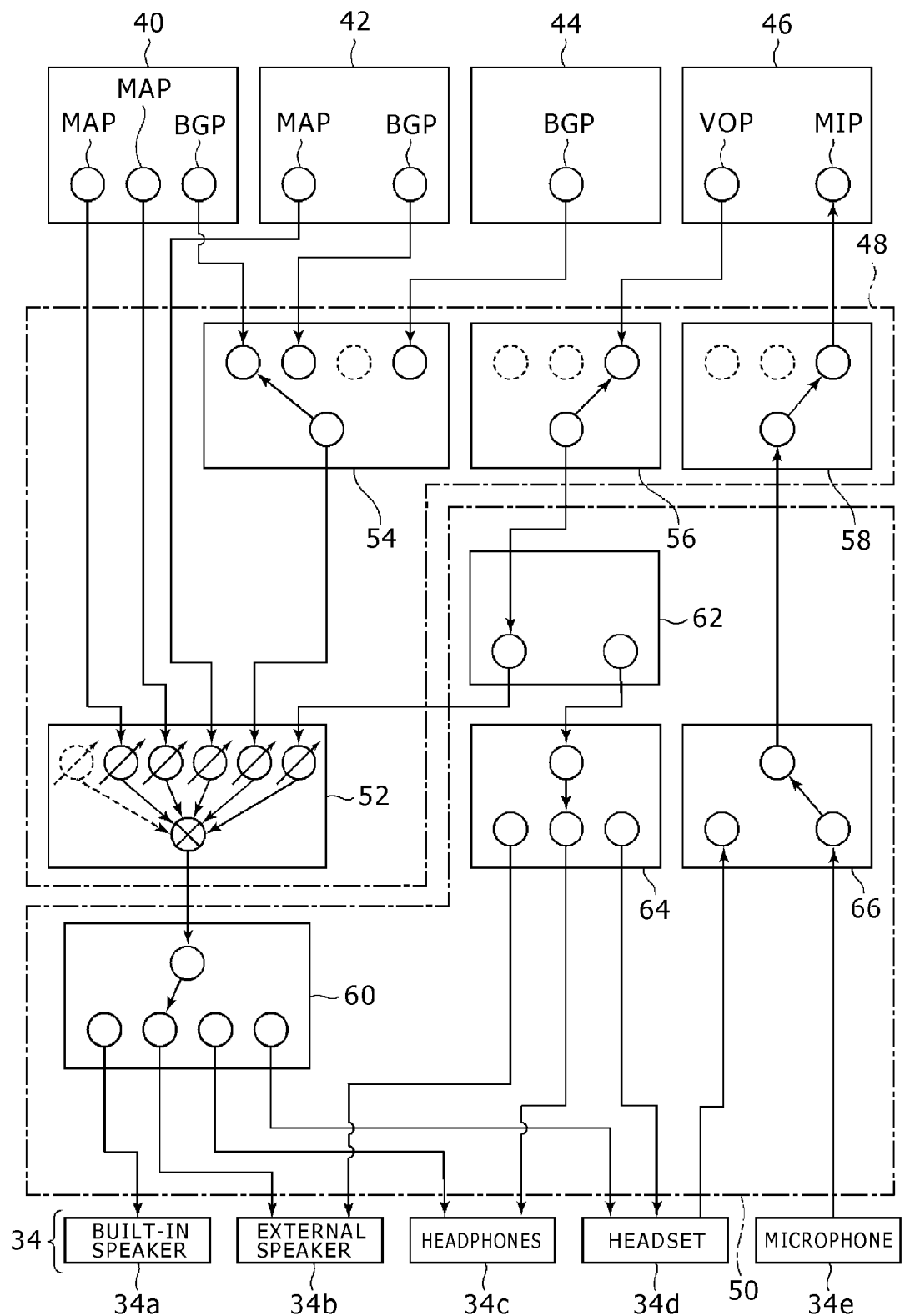
FIG. 3 is a diagram schematically showing an example of a sound input-output model in the information processing device according to one embodiment of the present invention.

FIG. 3 is a diagram schematically showing an example of a sound input-output model in the information processing device 10 according to the present embodiment. As shown in FIG. 3, in the present embodiment, the sound input-output section 34 includes for example: a speaker built in the casing 12 of the information processing device 10 (which speaker will hereinafter be referred to as a built-in speaker 34a); a speaker connected to the casing 12 of the information processing device 10 by a cable (which speaker will hereinafter be referred to as an external speaker 34b); headphones 34c connected to the casing 12 of the information processing device 10 by a cable; a hands-free headset (hereinafter, a headset) 34d as headphones provided with a microphone, which headset is connected to the casing 12 of the information processing device 10 by a cable; and a microphone 34e built in the casing 12 of the information processing device 10 or connected to the casing 12 of the information processing device 10 by a cable. In the present embodiment, a sound accompanying the execution of an application program in the information processing device 10 is output from at least one device included in the sound input-output section 34. In addition, a sound input from at least one device included in the sound input-output section 34 is output to an application program executed in the information processing device 10.

In the information processing device 10 according to the present embodiment, various application programs such as a game program and the like are installed in advance in the storage section 22 or an information storage medium read by the card slot 32 (stored in an executable state). The information processing device 10 executes the installed programs.

As shown in FIG. 3, when the information processing device 10 according to the present embodiment starts an application program installed in the information processing device 10, the information processing device 10 generates one or a plurality of processes corresponding to the application program. Thus, the application program started by the information processing device 10 according to the present embodiment operates as a process in the information processing device 10. A process generated by starting an application program will hereinafter be referred to as an application process. FIG. 3 shows: a game process 40 generated by starting a game program installed in the information processing device 10; a music player process 42 generated by starting a music player program installed in the information processing device 10; a time signal process 44 generated by starting a time signal program (for example a program informing the user of the time every hour) installed in the information processing device 10; and a chat process 46 generated by starting a chat program (for example a program allowing a chat to be enjoyed with a user of an information processing device 10 connected via the communicating section 24) installed in the information processing device 10. Incidentally, suppose that in the information processing device 10 according to the present embodiment, some application processes other than the processes illustrated in FIG. 3 are operating.

In the present embodiment, an application process is assigned at least one of at least one sound output port (three kinds of sound output ports in the present embodiment) and at least one sound input port (one kind of sound input port in the present embodiment).

The sound output ports according to the present embodiment are classified as either a synthetic output port or a selection output port. In the present embodiment, a MAIN port MAP corresponds to a synthetic output port, and a BGM port BGP and a VOICE port VOP correspond to a selection output port. In addition, in the present embodiment, a MIC port MIP corresponds to a sound input port.

In the present embodiment, for example, the game process 40 is assigned two MAIN ports MAP and one BGM port BGP. The music player process 42 is assigned one MAIN port MAP and one BGM port BGP. The time signal process 44 is assigned one BGM port BGP. The chat process 46 is assigned one VOICE port VOP and one MIC port MIP.

In the present embodiment, an application process is executed as either a foreground process or a background process. In addition, a program executed as a foreground process is changed according to an operation received from the user. In addition, in the present embodiment, the display section 26 displays an image generated accompanying the execution of the foreground process. In addition, in the present embodiment, the foreground process operates as a process to be operated by the user. The user can instruct the foreground process to perform processing by operating the touch sensor 28 or the operating section 30.

In addition, the information processing device 10 according to the present embodiment implements a function of managing sound input and output. The information processing device 10 according to the present embodiment functionally includes an application manager section and a device setting section with regard to the function of managing sound input and output. These functions are implemented by executing a program according to the present embodiment in the information processing device 10 as a computer. This program may be downloaded from another computer via a communicating interface by way of a computer communication network and provided to the information processing device 10, or may be stored on a computer readable information storage medium such as an optical disk (for example a CD-ROM, a DVD-ROM, a Blu-ray Disk, or the like), a USB memory, a memory card, or the like and provided from the information storage medium to the information processing device 10.

In the present embodiment, the application manager section is implemented as an application manager process 48 that is a process executed in the information processing device 10. The device setting section is implemented as a device setting process 50 that is a process executed in the information processing device 10. Of course, the implementation of the application manager section and the device setting section is not limited to the implementation in the present embodiment. For example, both of the application manager section and the device setting section may be implemented by one process.

The application manager process 48 is a process for managing sound input and output from and to application processes. The device setting process 50 is a process for managing sound input and output from and to various devices (for example the built-in speaker 34a, the external speaker 34b, the headphones 34c, the headset 34d, and the microphone 34e) as the sound input-output section 34 included in the information processing device 10.

In the present embodiment, the application manager process 48 functionally includes a sound synthesis managing section 52, a sound selection managing section (a BGM sound selection managing section 54 and a VOICE sound selection managing section 56 in the example of FIG. 3), and a MIC sound output destination selection managing section 58. The device setting process 50 functionally includes a synthetic sound output destination device managing section 60, a VOICE sound output route control section 62, a VOICE sound output destination device managing section 64, and a MIC sound receiving device managing section 66.

In the present embodiment, the BGM sound selection managing section 54 selects a predetermined number of processes (for example one process in the present embodiment) from a plurality of application processes outputting a sound from a BGM port BGP as application programs are executed (which application processes will hereinafter be referred to as BGM sound output processes). The selected process will hereinafter be referred to as a specific BGM sound output process. FIG. 3 shows a state in which the game process 40 is selected as the specific BGM sound output process. In addition, in the present embodiment, the VOICE sound selection managing section 56 selects a predetermined number of processes (for example one process in the present embodiment) from a plurality of application processes outputting a sound from a VOICE port VOP as application program processing is executed (which application processes will hereinafter be referred to as VOICE sound output processes). The selected process will hereinafter be referred to as a specific VOICE sound output process. FIG. 3 shows a state in which the chat process 46 is selected as the specific VOICE sound output process.

In addition, in the present embodiment, the VOICE sound output route control section 62 selects whether to output a sound output by the specific VOICE sound output process in a state of being included as a part of synthetic sound or whether to output the sound output by the specific VOICE sound output process independently of the synthetic sound according to an operation received from the user. FIG. 3 shows a state in which outputting the sound output by the specific VOICE sound output process in a state of being included as a part of the synthetic sound is selected.

In addition, in the present embodiment, the sound synthesis managing section 52 outputs, to the synthetic sound output destination device managing section 60, the synthetic sound obtained by synthesizing a sound output from a process outputting the sound from a MAIN port MAP as application program processing is executed (which process will hereinafter be referred to as a MAIN sound output process), the sound output from the specific BGM sound output process, and the sound output from the specific VOICE sound output process. Here, in the present embodiment, the sound synthesis managing section 52 includes the sound output from the specific VOICE sound output process as a part of the synthetic sound only when the VOICE sound output route control section 62 selects outputting the sound output by the specific VOICE sound output process in a state of being included as a part of the synthetic sound. In addition, in the present embodiment, the sound synthesis managing section 52 includes only a sound output from a process executed as a foreground process among MAIN sound output processes as a part of the synthetic sound, as a general rule.

However, in the present embodiment, MAIN sound output processes can output an any time attribute setting request requesting a sound to be output even when executed as background processes to the application manager process 48. This any time attribute setting request is for example output to the application manager process 48 according to an operation received from the user, or output to the application manager process 48 when an event for outputting an any time attribute setting request occurs during the execution of a MAIN sound output process. Then, regardless of whether the MAIN sound output process from which the any time attribute setting request is received is executed as a foreground process or executed as a background process, the sound synthesis managing section 52 includes a sound output from the MAIN port MAP of the MAIN sound output process as a part of the synthetic sound.

In the present embodiment, the synthetic sound output destination device managing section 60 outputs the sound synthesized by the sound synthesis managing section 52 to a sound output device (either the built-in speaker 34a, the external speaker 34b, the headphones 34c, or the headset 34d in the example of FIG. 3) determined according to an operation received from the user. Thus, the sound synthesized by the sound synthesis managing section 52 is output from the sound input-output section 34. FIG. 3 shows a state in which the external speaker 34b is determined as the sound output device to which the synthetic sound is output.

In the present embodiment, when the VOICE sound output route control section 62 selects outputting the sound output by the specific VOICE sound output process independently of the synthetic sound, the VOICE sound output destination device managing section 64 outputs the sound output from the specific VOICE sound output process to a sound output device (either the external speaker 34b, the headphones 34c, or the headset 34d in the example of FIG. 3) determined according to an operation received from the user. FIG. 3 shows a state in which the headphones 34c are determined as the sound output device to which the sound from the specific VOICE sound output process is output when the VOICE sound output route control section 62 selects outputting the sound output by the specific VOICE sound output process independently of the synthetic sound.

In addition, in the present embodiment, the MIC sound receiving device managing section 66 outputs a sound input from a sound input device (either the headset 34d or the microphone 34e in the example of FIG. 3) determined according to an operation received from the user to the MIC sound output destination selection managing section 58. FIG. 3 shows a state in which the microphone 34e is determined as the sound input device from which the sound output to the MIC sound output destination selection managing section 58 is input.

In addition, in the present embodiment, the MIC sound output destination selection managing section 58 selects a predetermined number of processes (for example one process in the present embodiment) from a plurality of application processes that are assigned a sound input port (which application processes will hereinafter be referred to as MIC sound input processes). The selected process will hereinafter be referred to as a specific MIC sound input process. FIG. 3 shows a state in which the chat process 46 is selected as the specific MIC sound input process. Then, the MIC sound output destination selection managing section 58 outputs the sound input from the MIC sound receiving device managing section 66 to the specific MIC sound input process.

As described above, in the present embodiment, a sound output from an application process (sound accompanying the execution of an application program) is output to the outside via the sound input-output section 34, and a sound input from the outside via the sound input-output section 34 is output to an application process.

In addition, the information processing device 10 according to the present embodiment changes the volume of the sound output to the outside via the sound input-output section 34 according to an operation received from the user. Further, the information processing device 10 according to the present embodiment changes the relative ratio of the volume output by the music player process 42 to the volume of the output synthetic sound according to an operation by the user of a superimposed screen displayed on the display section 26.

In the present embodiment, application processes output various requests to the application manager process 48 according to the contents of processing to be executed. For example, when an application process requests the output of a sound from a BGM port BGP, the application process outputs a BGM output right obtaining request in a default setting or a priority setting to the application manager process 48. In addition, when the application process abandons the request for the output of the sound from the BGM port BGP, the application process outputs a BGM output right abandoning request to the application manager process 48.

In addition, for example, when an application process requests the output of a sound from a VOICE port VOP, the application process outputs a VOICE output right obtaining request in a default setting or a priority setting to the application manager process 48. In addition, when the application process abandons the request for the output of the sound from the VOICE port VOP, for example, the application process outputs a VOICE output right abandoning request to the application manager process 48.

In addition, for example, when an application process requests the input of a sound from a MIC port MIP, the application process outputs a MIC input right obtaining request in a default setting or a priority setting to the application manager process 48. In addition, when the application process abandons the request for the input of the sound from the MIC port MIP, for example, the application process outputs a MIC input right abandoning request to the application manager process 48.

In addition, for example, when an application process requests the output of a sound by the application process itself in a state of all sounds output from other application processes being muted, the application process outputs an output right obtaining request in an exclusive control mode to the application manager process 48. When the application process abandons the request for the output of the sound by the application process itself in the state of all of the sounds output from the other application processes being muted, the application process outputs an output right abandoning request in the exclusive control mode to the application manager process 48. Incidentally, the default setting and the priority setting will be described later.

In addition, in the present embodiment, the selection of the specific BGM sound output process by the BGM sound selection managing section 54, the selection of the specific VOICE sound output process by the VOICE sound selection managing section 56, and the selection of the specific MIC sound input process by the MIC sound output destination selection managing section 58 are made on the basis of priority values included in priority management data stored in the storage section 22 in advance. In the present embodiment, the storage section 22 stores BGM priority management data 70 used for the selection of the specific BGM sound output process, the BGM priority management data 70 being illustrated in FIG. 4. In addition, in the present embodiment, also stored in addition to the BGM priority management data 70 are VOICE priority management data used for the selection of the specific VOICE sound output process, MIC priority management data used for the selection of the specific MIC sound input process, and exclusive control priority management data used for output right control in the exclusive control mode to be described later.

Description in the following will be made of processing of selecting the specific BGM sound output process from a plurality of BGM sound output processes, which processing is performed by the BGM sound selection managing section 54.

As shown in FIG. 4, the BGM priority management data 70 includes: a BGM priority management ID as an identifier of the BGM priority management data 70; application name data indicating the name of an application program as an object of management in the selection of the specific BGM sound output process; BGM output right obtaining request setting data indicating a BGM output right obtaining request setting for the application program (which setting assumes the value of one of a default setting and a priority setting in the present embodiment); and a BGM priority indicating a priority for the application program in the selection of the specific BGM sound output process. Incidentally, in the present embodiment, the larger the BGM priority value corresponding to an application process is, the more preferentially the application process is selected as the specific BGM sound output process. Then, in the present embodiment, the storage section 22 stores, in advance, the BGM priority management data 70 associated with each of application programs executable in the information processing device 10. Incidentally, the storage section 22 does not necessarily need to store the BGM priority management data 70 associated with all of the application programs executable in the information processing device 10.

Then, the application manager process 48 performs processing of selecting the specific BGM sound output process when receiving a BGM output right obtaining request, a BGM output right abandoning request, an FG process output right grant request to be described later, or a BGM proxy setting request to be described later, which is output from a BGM sound output process.

In the present embodiment, for example, a BGM sound output process outputs a BGM output right obtaining request in a priority setting or a BGM output right obtaining request in a default setting to the application manager process 48 at a time of a start. Whether the BGM sound output process outputs the BGM output right obtaining request in the priority setting or the BGM output right obtaining request in the default setting at the time of the start depends on the implementation of the application program on which the generation of the BGM sound output process is based. Specifically, for example, the application program may be implemented such that the BGM sound output process outputs the BGM output right obtaining request in the default setting in a situation in which another BGM sound output process is allowed to be selected as the specific BGM sound output process, and such that the BGM sound output process outputs the BGM output right obtaining request in the priority setting in a situation in which another BGM sound output process is not allowed to be selected as the specific BGM sound output process.

In addition, in the present embodiment, when the application process stops (when the process ends), the application process outputs a BGM output right abandoning request to the application manager process 48.

In addition, for example, a BGM sound output process may output a BGM output right obtaining request to the application manager process 48 according to the occurrence of an event accompanying the execution of processing in the BGM sound output process. In the present embodiment, for example, when music reproduction (for example the reproduction of a music file specified by the user) is started, the music player process 42 outputs a BGM output right obtaining request in a priority setting to the application manager process 48. In addition, when the music reproduction is ended, a BGM output right abandoning request is output to the application manager process 48. In addition, in the present embodiment, for example, when a change is made from conditions in which a game is played to conditions in which a moving image related to the game (for example a movie of a reviewed scene in the game) is reproduced, the game process 40 outputs a BGM output right obtaining request in a priority setting (which request in this case can also be said to be a BGM output right obtaining request in a music reproduction prohibiting setting) to the application manager process 48. On the other hand, when a change is made from conditions in which the moving image related to the game is reproduced to conditions in which the game is played, the game process 40 outputs a BGM output right obtaining request in a default setting to the application manager process 48.

In addition, in the present embodiment, without being limited to BGM sound output processes, an application process can output an FG process output right grant request, which is a request to make the application process being executed as a foreground process a target for selective sound input/output from/to the outside, to the application manager process 48. The FG process output right grant request is for example output to the application manager process 48 when a predetermined event occurs during the execution of the application process. Specifically, for example, the chat process 46 outputs the FG process output right grant request to the application manager process 48 when a voice chat is started between the user of the information processing device 10 and another user using an information processing device 10 that can communicate with the information processing device 10 in question. When the voice chat is ended, the chat process 46 outputs a BGM output right abandoning request to the application manager process 48.

In addition, in the present embodiment, without being limited to BGM sound output processes, an application process can output a BGM proxy setting request, which is a request to select another BGM sound output process as the specific BGM sound output process, to the application manager process 48. In the present embodiment, a BGM proxy setting request is associated with information identifying an application process to be selected as the specific BGM sound output process (which information is for example the ID, name, or the like of the application process) as a specification of a program to be made to input/output a sound.

Then, in the present embodiment, the storage section 22 stores, in advance, BGM output right obtaining request condition information (whose initial value is "absent") indicating conditions of a BGM output right obtaining request, FG process output right grant request condition information (whose initial value is "absent") indicating conditions of an FG process output right grant request, and BGM proxy setting request condition information (whose initial value is "Null") indicating conditions of a BGM proxy setting request, for each application process. Then, when the BGM sound selection managing section 54 receives a request from an application process, the BGM sound selection managing section 54 updates the above-described information for the application process.

When the BGM sound selection managing section 54 receives a BGM output right obtaining request or a BGM output right abandoning request from an application process, for example, the BGM sound selection managing section 54 updates the BGM output right obtaining request condition information of the application process. More specifically, for example, when the BGM sound selection managing section 54 receives a BGM output right obtaining request in a priority setting after receiving a BGM output right obtaining request in a default setting from an application process, the BGM sound selection managing section 54 sets the value of the BGM output right obtaining request condition information of the application process to "priority setting." In addition, when the BGM sound selection managing section 54 receives a BGM output right obtaining request in a default setting after receiving a BGM output right obtaining request in a priority setting from an application process, the BGM sound selection managing section 54 sets the value of the BGM output right obtaining request condition information of the application process to "default setting." In addition, when the BGM sound selection managing section 54 receives a BGM output right abandoning request after receiving a BGM output right obtaining request from an application process, the BGM sound selection managing section 54 sets the value of the BGM output right obtaining request condition information of the application process to "absent."

In addition, when the BGM sound selection managing section 54 receives an FG process output right grant request from an application process, for example, the BGM sound selection managing section 54 sets the value of the FG process output right grant request condition information of the application process to "present." When a BGM output right abandoning request is thereafter received from the application process, the value of the FG process output right grant request condition information of the application process is set to "absent."

In addition, when the BGM sound selection managing section 54 receives a BGM proxy setting request from an application process, for example, the BGM sound selection managing section 54 sets the value of the BGM proxy setting request condition information of the application process to information associated with the BGM proxy setting request (which information is for example an ID, a name, or the like identifying an application process to be selected as the specific BGM sound output process).

Then, in the present embodiment, the BGM sound selection managing section 54 selects the specific BGM sound output process on the basis of the BGM priority management data 70 in timing in which the BGM sound selection managing section 54 receives the above-described requests.

In the BGM priority management data 70 shown in FIG. 4, a BGM priority value corresponding to an application program that makes a BGM output right obtaining request in a default setting is set to 0. In addition, as for application programs that make a BGM output right obtaining request in a priority setting, a different BGM priority value is set for each application program. In the example of FIG. 4, a BGM priority value corresponding to the music player program is set to 10, a BGM priority value corresponding to the game program is set to 30, and a BGM priority value corresponding to the time signal program is set to 40. In addition, in the example of FIG. 4, a BGM priority value corresponding to the chat program is set to 20. This value is a BGM priority value used when an FG process output right grant request is received from the chat process 46 (which BGM priority value will hereinafter be referred to as a sub-priority value).

Figure 5B:
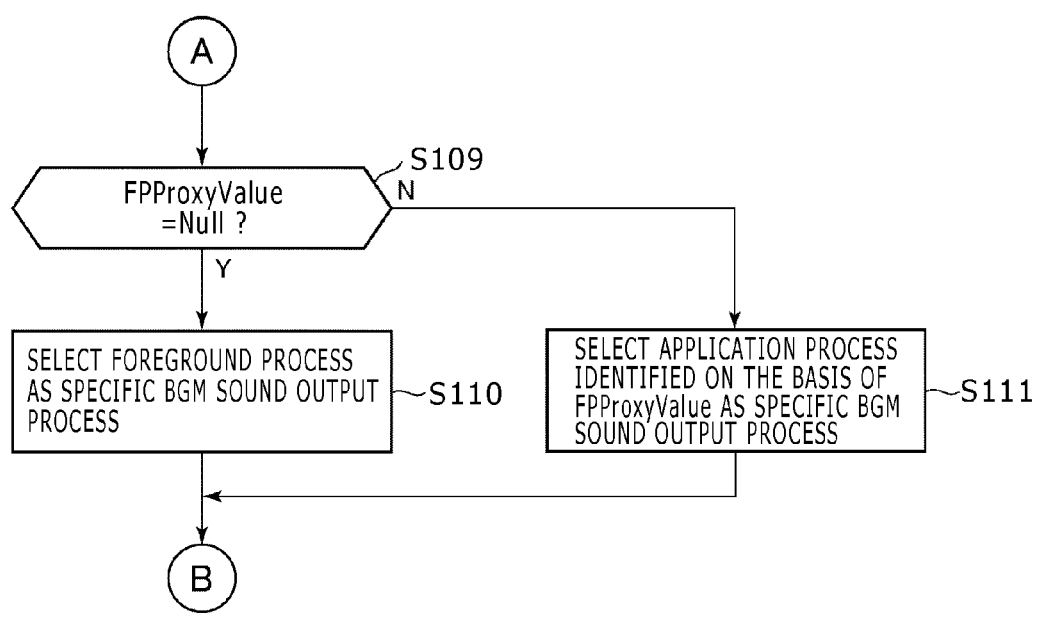
FIG. 5B is a flowchart of an example of a flow of processing performed in the information processing device according to one embodiment of the present invention.

An example of a flow of processing of selecting the specific BGM sound output process, which processing is performed in the information processing device 10 according to the present embodiment, will be described in the following with reference to flowcharts illustrated in FIG. 5A and FIG. 5B.

First, the BGM sound selection managing section 54 determines whether or not there is an application process whose BGM output right obtaining request condition information has a value of "priority setting" (which application process will hereinafter be referred to as a priority setting process) (S101).

When there is a priority setting process (S101: Y), the BGM sound selection managing section 54 determines whether or not there is an application process whose FG process output right grant request condition information has a value of "present" (which application process will hereinafter be referred to as a grant requesting process) (S102). When there is a grant requesting process (S102: Y), the BGM sound selection managing section 54 obtains a BGM priority value corresponding to the priority setting process and a BGM priority value corresponding to the grant requesting process (that is, a sub-priority value) (S103). Then, the BGM sound selection managing section 54 identifies an application process corresponding to a maximum value of the values obtained in the processing shown in S103 as a maximum priority process (S104).

Then, the BGM sound selection managing section 54 determines whether the maximum priority process is a priority setting process or a grant requesting process (S105). When the maximum priority process is a priority setting process, the BGM sound selection managing section 54 determines whether or not the value (MPProxyValue) of the BGM proxy setting request condition information of the maximum priority process is "Null" (S106). Then, when the value (MPProxyValue) of the BGM proxy setting request condition information of the maximum priority process is "Null" (S106: Y), the BGM sound selection managing section 54 selects the maximum priority process as the specific BGM sound output process (S107), and ends the processing shown in the present processing example. On the other hand, when the value (MPProxyValue) of the BGM proxy setting request condition information of the maximum priority process is not "Null" (S106: N), the BGM sound selection managing section 54 selects, as the specific BGM sound output process, an application process identified on the basis of the value (MPProxyValue) of the BGM proxy setting request condition information of the maximum priority process (that is, an application process whose identifying information is represented by the value (MPProxyValue) of the BGM proxy setting request condition information of the maximum priority process) (S108), and ends the processing shown in the present processing example.

When the maximum priority process is identified as a grant requesting process in the processing shown in S105, the BGM sound selection managing section 54 determines whether or not the value (FPProxyValue) of the BGM proxy setting request condition information of the application process being executed as a foreground process is "Null" (S109). When the value (FPProxyValue) of the BGM proxy setting request condition information of the application process being executed as a foreground process is "Null" (S109: Y), the BGM sound selection managing section 54 selects the application process being executed as a foreground process as the specific BGM sound output process (S110). On the other hand, when the value (FPProxyValue) of the BGM proxy setting request condition information of the application process being executed as a foreground process is not "Null" (S109: N), the BGM sound selection managing section 54 selects, as the specific BGM sound output process, an application process identified on the basis of the value (FPProxyValue) of the BGM proxy setting request condition information of the application process being executed as a foreground process (that is, an application process whose identifying information is represented by the value (FPProxyValue) of a proxy setting status of the application process being executed as a foreground process) (S111).

When it is determined in the processing shown in S102 that there is no grant requesting process (S102: N), the BGM sound selection managing section 54 obtains the BGM priority value corresponding to the priority setting process (S112). Then, the BGM sound selection managing section 54 identifies an application process corresponding to a maximum value of the values obtained in the processing shown in S112 as a maximum priority process (S113). Then, the BGM sound selection managing section 54 performs the processing from S106 on down, and ends the processing shown in the present processing example.

When it is determined in processing shown in S101 that there is no priority setting process (S101: N), the BGM sound selection managing section 54 performs the processing from S109 on down, and ends the processing shown in the present processing example.

The processing of selecting the specific BGM sound output process is performed as described above. Incidentally, in the above-described processing example, one application process is selected as the specific BGM sound output process. However, the number of application processes selected as the specific BGM sound output process is not limited to one. For example, a predetermined number of application processes may be selected in descending order from the one having the largest priority value as specific BGM sound output processes. In addition, in the present embodiment, suppose that none of application processes are selected as the specific BGM sound output process when an application process selected as the specific BGM sound output process is not a BGM sound output process (for example, when an application process being executed as a foreground process is selected as the specific BGM sound output process in the processing shown in the above-described processing example, but the application process is not a BGM sound output process).

In addition, in the present embodiment, the storage section 22 of the information processing device 10 stores BGM maximum priority data indicating a maximum BGM priority value and maximum sub-priority data indicating a maximum sub-priority value. Then, when the above-described processing is performed, the BGM sound selection managing section 54 sets the BGM priority value corresponding to the maximum priority process as the value of the BGM maximum priority data. In addition, when there is a grant requesting process, the BGM sound selection managing section 54 sets the sub-priority value of the grant requesting process whose corresponding sub-priority value is a maximum as the value of the maximum sub-priority data.

In addition, in the processing shown in the above-described processing example, the BGM sound selection managing section 54 may select the specific BGM sound output process on the basis of the value of the BGM maximum priority data and the value of the maximum sub-priority data. Specifically, for example, when the BGM sound selection managing section 54 receives a BGM output right obtaining request in a priority setting from a BGM sound output process, and the BGM priority value in the priority setting which BGM priority value corresponds to the BGM sound output process is larger than the value of the BGM maximum priority data, the BGM sound selection managing section 54 may select the BGM sound output process as the specific BGM sound output process, and set the BGM priority value in the priority setting which BGM priority value corresponds to the BGM sound output process as the value of the BGM maximum priority data. In this case, the output right obtaining request by the BGM sound output process has succeeded, and the specific BGM sound output process is changed. On the other hand, when the BGM priority value in the priority setting which BGM priority value corresponds to the BGM sound output process is smaller than the value of the BGM maximum priority data, the BGM sound selection managing section 54 may not change the specific BGM sound output process. In this case, the output right obtaining request by the BGM sound output process has failed, and the specific BGM sound output process is not changed.

Then, when the application process selected as the specific BGM sound output process is changed as described above, the BGM sound selection managing section 54 notifies the application process selected as the specific BGM sound output process that the application process is selected as the specific BGM sound output process, and notifies the application process that was selected as the specific BGM sound output process before the change that the selection of the application process as the specific BGM sound output process is cancelled.

Here, the application process receiving the notification that the selection of the application process as the specific BGM sound output process is cancelled may perform processing in response to the reception of the notification. For example, the application process receiving the notification that the selection of the application process as the specific BGM sound output process is cancelled may stop processing being performed, or output a BGM output right obtaining request in a priority setting to the application manager process 48.

According to the information processing device 10 according to the present embodiment, for example, when a BGM output right obtaining request in a priority setting is output from the time signal process 44 in conditions in which the music player process 42 and the game process 40 are executed and a sound from the BGM port BGP of the music player process 42 is selectively output to the outside by the BGM sound selection managing section 54, the sound selectively output to the outside by the BGM sound selection managing section 54 is changed from the sound from the BGM port BGP of the music player process 42 to a sound from the BGM port BGP of the time signal process 44. At this time, the music player process 42 is notified that the selection of the music player process 42 as the specific BGM sound output process is cancelled. Then, in the present embodiment, when the music player process 42 receives the notification that the selection of the music player process 42 as the specific BGM sound output process is cancelled, the music player process 42 temporarily stops music reproduction and outputs information indicating that music reproduction is temporarily stopped (for example a character string "music reproduction is temporarily stopped") to the display section 26 such as a display or the like to display the information on the display section 26. When a BGM output right abandoning request is thereafter output from the time signal process 44 for example after an end of the output of a time signal sound by the time signal process 44, the sound selectively output to the outside by the BGM sound selection managing section 54 is returned from the sound from the BGM port BGP of the time signal process 44 to the sound from the BGM port BGP of the music player process 42.

In addition, for example, when a BGM output right obtaining request in a priority setting is output from the time signal process 44 in conditions in which the game process 40 is executed, the music player process 42 is not executed, and a sound from the BGM port BGP of the game process 40 is selectively output to the outside by the BGM sound selection managing section 54, the sound selectively output to the outside by the BGM sound selection managing section 54 is changed from the sound from the BGM port BGP of the game process 40 to the sound from the BGM port BGP of the time signal process 44. When a BGM output right abandoning request is then output from the time signal process 44 for example after an end of the output of a time signal sound by the time signal process 44, the sound selectively output to the outside by the BGM sound selection managing section 54 is returned from the sound from the BGM port BGP of the time signal process 44 to the sound from the BGM port BGP of the game process 40.

Thus, when sound input/output for a program as a target for selective sound input/output from/to the outside is ended, the information processing device 10 according to the present embodiment changes the program as the target for selective sound input/output from/to the outside to an application program determined as having highest priority from among other application programs on the basis of priority values set to the other application programs, respectively.

In addition, in the present embodiment, the selection of the specific VOICE sound output process in response to reception of a VOICE output right obtaining request, a VOICE output right abandoning request, and the like and the selection of the specific MIC sound input process in response to reception of a MIC input right obtaining request, a MIC input right abandoning request, and the like are made by processing similar to the processing for the specific BGM sound output process as described above. Hence, in the present embodiment, the processing similar to the processing for the specific BGM sound output process not only controls the selection of an application program serving as an output source of a sound selectively output to the outside but also controls the selection of an application process to which a sound input from the outside is selectively output.

In addition, in the information processing device 10 according to the present embodiment, application processes can output an output right obtaining request in the exclusive control mode and an output right abandoning request in the exclusive control mode to the application manager process 48. Incidentally, application processes that can make requests in the exclusive control mode are not limited to an application process being executed as a foreground process, but application processes being executed as background processes can also make requests in the exclusive control mode.

Then, the application manager process 48 identifies an application process whose priority value in corresponding exclusive control priority management data is a maximum from application processes from which an output right obtaining request in the exclusive control mode is received. Then, the application manager process 48 mutes all sounds output from the application processes other than the identified application process. At this time, the application manager process 48 notifies the application processes whose output sounds are muted to that effect. When the application manager process 48 then receives an output right abandoning request in the exclusive control mode from the identified application process for example after the identified application process is ended or a predetermined event has occurred, the application manager process 48 performs control so as to return to conditions before the muting.

In addition, an output right obtaining request in the exclusive control mode can be associated with a specification of a sound output device and a specification of an audio output format for an output sound. Then, the application manager process 48 performs control for example to output the sound output from the identified application process from the specified sound output device (for example output the sound from all sound output devices that can perform output) or output the sound output from the identified application process in the specified audio output format.

In addition, in the present embodiment, when an output sound is changed, cross-fade processing is performed which gradually increases the volume of a sound after the change while gradually decreasing the volume of a sound before the change. For example, when a MAIN sound output process executed as a foreground process is changed according to an operation by the user, the sound synthesis managing section 52 performs cross-fade processing that gradually increases the volume of a sound output from the MAIN sound output process executed as a foreground process after the change, the sound being included as a part of a synthetic sound, while gradually decreasing the volume of a sound output from the MAIN sound output process executed as a foreground process before the change. In addition, for example, when the BGM sound selection managing section 54 changes the sound output selectively, the BGM sound selection managing section 54 performs cross-fade processing that gradually increases the volume of a sound after the change while gradually decreasing the volume of the sound before the change.

As described above, the information processing device 10 according to the present embodiment obtains priority values set to a plurality of application programs, respectively. Then, the information processing device 10 according to the present embodiment performs control such that an application program selected from among a plurality of application programs on the basis of the obtained priority values becomes a target for selective sound input/output from/to the outside. Thus, according to the present embodiment, a program selected from among a plurality of application programs on the basis of priority values is controlled to be a target for selective sound input/output from/to the outside by merely setting priority management data. Therefore settings for selective changing control of a program as a target for sound input/output can be changed flexibly.

It is to be noted that the present invention is not limited to the foregoing embodiments.

For example, the sound synthesis managing section 52 may include both of a sound output from a process being executed as a background process and a sound output from a process being executed as a foreground process in the synthetic sound output to the synthetic sound output destination device managing section 60. In addition, at this time, when the sound synthesis managing section 52 generates the synthetic sound, control may be performed such that the volume of the sound output from the process being executed as a background process is lower than the volume of the sound output from the process being executed as a foreground process.

In addition, the sound output ports and the sound input ports described above are not limited to specific uses. For example, a BGM port BGP may be used to output a sound other than background music, and a VOICE port VOP may be used to output a sound other than a voice uttered by the user.

In addition, for example, when a process being executed as a foreground process is suspended in conditions in which the music player process 42 is being executed as a background process, the information processing device 10 may perform control such that the sound output by the music player process 42 is not output to the outside.

In addition, the information processing device 10 according to the present embodiment is not limited to portable type game machines. For example, the information processing device 10 according to the present embodiment may be applied to game consoles, personal computers, and the like.

In addition, the information processing device 10 may include for example a hard disk drive, a camera, an acceleration sensor, and the like. In addition, the above-described information processing device 10 may be formed of a plurality of casings. Then, the processing performed by the above-described information processing device 10 may be performed while shared by the above-described plurality of casings.

In addition, the above concrete character strings and the concrete character strings in the drawings are illustrative, and are not limited to these character strings.

The invention claimed is:

1. An information processing device comprising:
   a receiving unit configured to receive a request for selective sound input/output from/to an outside for a requesting program according to occurrence of an event accompanying execution of the requesting program; and
   an input/output target control unit configured to perform control such that a program, which includes said requesting program, is selected from a plurality of programs in said information processing device on a basis of a priority value set to each of the plurality of programs, wherein the selected program becomes a target for selective sound input/output from/to the outside,
   wherein the input/output target control unit uses a value determined on a basis of conditions when the event has occurred as the priority value set to the program in which the event has occurred,
   wherein when said requesting program requests that a program that has generated displayed information be set as the target for selective sound input/output from/to the outside on the basis of the priority values, the input/output target control unit performs control such that the program that has generated the displayed information becomes the target for selective sound input/output from/to the outside.

2. The information processing device according to claim 1, wherein when sound input/output for the program as the target for selective sound input/output from/to the outside is ended, the input/output target control unit changes the program as the target for selective sound input/output from/to the outside to a program determined as having highest priority from among other programs of the at least one program on a basis of the priority values set to the other programs, respectively.

3. The information processing device according to claim 1, wherein when a specification of a program to be made to input/output a sound is set in the program selected on the basis of the priority values, the input/output target control unit performs control such that the specified program becomes the target for selective sound input/output from/to the outside, and the input/output target control unit otherwise performs control such that the program selected on the basis of the priority values becomes the target for selective sound input/output from/to the outside.

4. The information processing device according to claim 1, wherein when the input/output target control unit changes an output sound, the input/output target control unit performs cross-fade processing that gradually increases volume of a sound after the change while gradually decreasing volume of the sound before the change.

5. An information processing method comprising:
a receiving step of receiving a request for selective sound input/output from/to an outside for a requesting program according to occurrence of an event accompanying execution of the requesting program; and
an input/output target control step of performing control such that a program, which includes the requesting program, is selected from a plurality of programs in said information processing device on a basis of a priority value set to each of the plurality of programs, wherein the selected program becomes a target for selective sound input/output from/to the outside,
wherein in the input/output target control step, a value determined on a basis of conditions when the event has occurred is used as the priority value set to the program in which the event has occurred
wherein when said requesting program requests that a program that has generated displayed information be set as the target for selective sound input/output from/to the outside on the basis of the priority values, the input/output target control unit performs control such that the program that has generated the displayed information becomes the target for selective sound input/output from/to the outside.

6. A computer including a processor operating under the control of a computer program, which causes the computer to function as:
a receiving unit configured to receive a request for selective sound input/output from/to an outside for a requesting program according to occurrence of an event accompanying execution of the requesting program; and
an input/output target control unit configured to perform control such that a program, which includes said requesting program, is selected from a plurality of programs in said information processing device on a basis of a priority value set to each of the plurality of programs, wherein the selected program becomes a target for selective sound input/output from/to the outside,
wherein the input/output target control unit uses a value determined on a basis of conditions when the event has occurred as the priority value set to the program in which the event has occurred,
wherein when said requesting program requests that a program that has generated displayed information be set as the target for selective sound input/output from/to the outside on the basis of the priority values, the input/output target control unit performs control such that the program that has generated the displayed information becomes the target for selective sound input/output from/to the outside.

7. A non-transitory, computer readable information storage medium storing a program, the program making a computer function as:
a receiving unit configured to receive a request for selective sound input/output from/to an outside for a requesting program according to occurrence of an event accompanying execution of the requesting program; and
an input/output target control unit configured to perform control such that a program, which includes said requesting program, is selected from a plurality of programs in said information processing device on a basis of a priority value set to each of the plurality of programs, wherein the selected program becomes a target for selective sound input/output from/to the outside,
wherein the input/output target control unit uses a value determined on a basis of conditions when the event has occurred as the priority value set to the program in which the event has occurred,
wherein when said requesting program requests that a program that has generated displayed information be set as the target for selective sound input/output from/to the outside on the basis of the priority values, the input/output target control unit performs control such that the program that has generated the displayed information becomes the target for selective sound input/output from/to the outside.

8. An information processing device comprising:
a receiving unit configured to receive a request for selective sound input/output from/to an outside for a requesting program according to occurrence of an event accompanying execution of the requesting program; and
an input/output target control unit configured to perform control such that a program, which includes said requesting program, is selected from a plurality of programs in said information processing device on a basis of a priority value set to each of the plurality of programs, wherein the selected program becomes a target for selective sound input/output from/to the outside,
wherein the input/output target control unit uses a value determined on a basis of conditions when the event has occurred as the priority value set to the program in which the event has occurred,
wherein the input/output target control unit determines on the basis of the conditions when the event has occurred whether to use, as the priority value set to the requesting program in which the event has occurred, a value for making the requesting program in which the event has occurred selected as the target for selective sound input/output from/to the outside, or whether to use, as the priority value set to the requesting program in which the event has occurred, a value for making another program of said plurality of programs stored in said information processing device as a target for selection,
wherein the receiving unit receives a request for the selective sound input/output from/to the outside for a game program according to occurrence of an event accompanying execution of processing of the game program, and
when a change is made from conditions in which a game is played to conditions in which a moving image related to the game is reproduced, the input/output target control unit uses, as a priority value set to the game program, a value for making the game program selected as the target for selective sound input/output from/to the outside, and when a change is made from the conditions in which the moving image related to the game is reproduced to the conditions in which the game is played, the input/output target control unit uses, as the priority value set to the game program, a value for making another program of said plurality of programs stored in said information processing device as a target for selection.

9. An information processing device comprising:

a receiving unit configured to receive a request for selective sound input/output from/to an outside for a requesting program according to occurrence of an event accompanying execution of the requesting program; and an input/output target control unit configured to perform control such that a program, which includes said requesting program, is selected from a plurality of programs in said information processing device on a basis of a priority value set to each of the plurality of programs, wherein the selected program becomes a target for selective sound input/output from/to the outside, wherein the input/output target control unit uses a value determined on a basis of conditions when the event has occurred as the priority value set to the program in which the event has occurred, wherein the input/output target control unit determines on the basis of the conditions when the event has occurred whether to use, as the priority value set to the requesting program in which the event has occurred, a value for making the requesting program in which the event has occurred selected as the target for selective sound input/output from/to the outside, or whether to use, as the priority value set to the requesting program in which the event has occurred, a value for making another program of said plurality of programs stored in said information processing device as a target for selection, wherein the receiving unit receives a request for the selective sound input/output from/to the outside for a game program according to occurrence of an event accompanying execution of processing of the game program, and when a change is made from conditions in which a game is played to conditions in which a moving image related to the game is reproduced, the input/output target control unit uses, as a priority value set to the game program, a value for making the game program selected as the target for selective sound input/output from/to the outside, and when a change is made from the conditions in which the moving image related to the game is reproduced to the conditions in which the game is played, the input/output target control unit uses, as the priority value set to the game program, a value for making another program of said plurality of programs stored in said information processing device as a target for selection.

* * * * *